3,068,093
METHOD OF PURIFYING THORIUM
Alfred J. Darnell, Altadena, William A. McCollum, Jr., North Hollywood, and Charles J. Meechan, Reseda, Calif., assignors, by mesne assignments, to the United States of America as represented by the United States Atomic Energy Commission
No Drawing. Filed Mar. 3, 1959, Ser. No. 796,738
6 Claims. (Cl. 75—84.1)

This invention relates to a method of purifying thorium. More particularly, this invention relates to a method of decreasing the oxide content of a thorium-containing workpiece or specimen.

Thorium is an important element in the atomic energy field since the capture of a neutron by a thorium-232 atom and subsequent beta emission results in the formation of uranium-233, a fissionable isotope. Thorium-232, which has no neutron emitting isotope, forms thorium-233 with the aid of an outside source of neutrons. Consequently, thorium is used together with uranium-235 in nuclear reactors. Because of the importance of thorium, a great deal of effort has been expended on the purification of thorium. One particular phase of the purification which has commanded considerable attention is the removal of thorium oxide impurities from thorium metal. Investigators have found, for example, that casting thorium by both induction melting and by arc melting results in a product containing a considerable amount of oxygen in the form of oxides of thorium. The presence of the oxides is detrimental because they reduce ductility and impair the cold working characteristics of the metal. When the metal is free of oxygen, it can be subjected to continuous cold working without having to resort to periodic annealing. An oxygen-free surface on the thorium permits better metal-to-metal bonding in welding operations when, for example, two pieces of thorium are joined together. One method of obtaining pure thorium is by thermal decomposition of thorium halides. This, however, is an expensive process and a need therefore exists for a more efficient process of reducing the oxide content of thorium metal.

It is, therefore, an object of this invention to provide a process for decreasing the oxygen content of thorium-containing specimens, including thorium-containing alloys. Another object is to provide a process for effecting a reduction in the oxides of thorium content of thorium workpieces. It is likewise an object of this invention to provide a process for reducing the oxide content of thorium workpieces by a process which contains a minimum of process steps. Another object of this invention is to provide a process for decreasing the oxides of thorium content of thorium workpieces which does not require the addition of other reagents to the thorium. Still another object is to provide a method for reducing the oxide content of thorium without necessarily resorting to melting the thorium workpiece. A further object of this invention is to provide a more efficient and simplified procedure for the removal of oxides from a thorium-containing workpiece, specimen, or melt. Still other objects of this invention will become apparent from the discussion which follows.

The above objects of this invention are accomplished by a method of decreasing the oxide impurities in a thorium-containing workpiece or specimen, including a thorium-containing alloy, comprising heating said workpiece in the substantial absence of an external source of oxides of thorium-producing impurities at a temperature of from about 1000° C. to about 4000° C. for a period of time sufficient to decrease the oxide content of said workpiece. In other words, the thorium oxide content of a thorium-containing workpiece can be reduced when such workpiece is heated without being in contact with any material which would react with the thorium to produce oxides of thorium, in an atmosphere substantially free of oxygen, and this includes oxygen-containing substances, at the temperatures indicated.

The mechanism by which the decrease in the oxide content is accomplished is believed to be by the volatilization of thorium monoxide. Upon heating a mixture of thorium and thorium dioxide it reacts to form thorium monoxide, which volatilizes from the surface into the surrounding atmosphere under certain favorable conditions as set out more fully hereinbelow. It is not intended, however, to limit the scope of this invention by any theory that may be advanced to explain the effects observed.

It is found, for example, that gaseous products must be removed from the surface of the workpiece in order to effect a lowering of the oxide content of the thorium-containing workpiece. If the gaseous products are not removed, a saturated partial pressure of the oxygen-containing impurity is built up over the surface of the thorium-containing workpiece, hindering further purification. Hence, if an atmosphere of an inert gas is employed in carrying out the process of this invention, two serious drawbacks are encountered. One of these is that the small amount of nitrogen; oxygen or oxygen-containing gases such as carbon monoxide, carbon dioxide, water vapor; and oxygen-containing hydrocarbons such as acetone, etc., present, even if the inert gas has been previously purified, is usually found to be sufficient to introduce impurities into the speciment at a greater rate than the rate of removal of oxide impurities by the process of this invention. The presence of nitrogen would, of course, introduce nitride impurities not desired in pure thorium. The other shortcoming in the use of an inert gas atmosphere is that the removal of the vaporized impurity from the surface of the heated workpiece is limited by the diffusion rate of the impurity into the gaseous atmosphere. A saturated partial pressure of the impurity is soon built up at the surface of the heated thorium workpiece and consequently no noticeable amount of removal of the impurity is accomplished. Therefore, in order to effect a reduction in the oxide content of a thorium-containing workpiece, or specimen, it is necessary to sweep the gaseous products or species away from the surface of the workpiece during the heating operation. If an inert atmosphere, such as argon, is employed, it must first be thoroughly purified of oxygen or oxygen-containing gases and nitrogen and then must be swept through the apparatus in which the heating is being carried out in order that the gases in the vicinity of the surface of the heated workpiece are continuously being renewed. In that manner, the build-up of a saturation partial pressure of the oxide impurity is prevented. It is found, for example, that the use of argon containing about 10 parts per million (p.p.m.) by weight of oxygen, at a flow rate such that the argon in a fixed volume is renewed about every 10 minutes at 1 atmosphere of pressure, produces a decrease in the oxide content of a thorium specimen when the latter is maintained at a temperature of from about 1400° C. to about 4000° C. When the temperature of the specimen is maintained at from about 1200° C. to about 1400° C., the tolerable oxygen content of an inert gas atmosphere is about 1 p.p.m., and at temperatures of from about 1000° C. to about 1200° C. the amount of oxygen should be less than about 0.1 p.p.m. When the heating is carried out in a static inert atmosphere, no appreciable decrease in the oxygen content of a thorium specimen is noted for reasons discussed elsewhere in this writing.

An alternative and more efficient method is to heat the thorium-containing workpiece in a vacuum. It is found, for example, that in a static system no noticeable purification of a thorium-containing specimen is accomplished when the partial pressure of a contaminant producing gas is higher than about $10^{-3}$ mm. of Hg. At temperatures above about 1300° C., a decrease in the oxide content is achieved at partial pressures of contaminants of about $10^{-4}$ mm. of Hg, while in the temperature range of from about 1000° C. to about 1300° C., a partial pressure of less than about $10^{-5}$ mm. of Hg is required. The vacuum process, however, has its limitation if the container in which the workpiece is being heated is maintained at the same temperature as the workpiece. Under the latter conditions, a saturation pressure of the impurity is soon built up in the container preventing any further removal of the oxide impurity from the workpiece. Upon cooling the apparatus and its contents, a large percentage of the vaporized impurity condenses on the workpiece and consequently no appreciable purification is obtained.

A preferred embodiment of this invention is to heat the oxides contaminated thorium-containing workpiece in a vacuum apparatus which is equipped with a region maintained at a lower temperature than the temperature of the workpiece. In such an apparatus, any impurities, including oxides of thorium impurities, which escape from the workpiece, tend to flow to and condense in the lower temperature region. This prevents a build-up of a saturation pressure of the impurity at the surface of the heated workpiece. A substantial reduction in the oxides content of the thorium-containing workpiece is thereby accomplished.

One method of providing a low temperature region in the apparatus in which the thorium-containing metal or alloy is heated, is to cool the walls of the container while simultaneously heating the metal or alloy workpiece. This can be accomplished by inductively heating the workpiece while the container walls remain cool. Another method is to heat the workpiece by resistance heating in which case the walls of the container can be maintained at a lower temperature. Arc melting is still another way of imparting heat to a workpiece without heating the container to the same temperature. In the latter instance, however, the precautions as to the type of atmosphere maintained within the container and the removal of the impurities from the surface of the heated specimen must be considered as discussed hereinabove.

Another method of providing a region which is maintained at a lower temperature than the temperature of the heated workpiece or composition is to provide the apparatus with an element equipped with means for cooling so that the surface of the element can be readily maintained at a temperature lower than the temperature of the heated workpiece. In such an apparatus, the impurities which escape the surface of the heated workpiece or composition flow to, and collect on the cooler surface, thus preventing a build-up of a saturation partial pressure of the impurity at the surface of the workpiece. The insertion of a cool element into the apparatus may be utilized either in a system employing vacuum techniques or a system employing an inert atmosphere. However, as stated above, if an inert atmosphere is used, the partial pressure of contaminant-producing components must be less than about $10^{-4}$ mm. of Hg and the atmosphere is to be renewed over the surface of the element or composition being purified in order to prevent the build-up of a saturation pressure of the impurity at the surface.

The cool surface and the cooler region of the apparatus should be at least one degree cooler than the heated workpiece, or composition. Preferably, the cool surface should be from about 100° C. to about 1000° C. cooler than the surface of the workpiece or composition in order to provide an efficient condensation and removal of the oxides of thorium impurity from the thorium-containing composition. For example, it is found that satisfactory removal of oxides of thorium from a thorium-containing composition is effected when the temperature of the cold surface is about 1299° C., while the temperature of the heated composition is about 1300° C.

The temperature at which the thorium-containing workpiece or composition should be heated in order to effect a decrease in the oxides of thorium impurity content should be from about 1000° C. to about 4000° C. No noticeable decrease in the oxide content is observed at temperatures below about 1000° C. However, the rate of oxide removal below 1300° C. is very slow and a preferred range of temperatures is from about 1300° C. to about 4000° C. No additional advantage is obtained in heating the workpiece or composition above about 4000° C. A preferred upper temperature is about 2800° C. since the loss due to vaporization of thorium metal is minimized below this temperature.

One great advantage of the process of this invention is that the oxides of thorium impurities can be removed from the thorium-containing workpiece or specimen without melting the latter. Therefore, a preferable range of temperatures of the workpiece at which purification can be accomplished in the solid state is from about 1300° C. to the melting point of about 1700° C. For an appreciable rate of decontamination while keeping the vaporization rate of the thorium within reasonable limits, a temperature within a range of from about 1400° C. to about 1690° C. is preferred. A range of from about 1400° C. to about 1676° C. is especially preferred since at the latter temperature the specimen can be heated for long periods of time without appreciable loss of thorium by vaporization of the metal. The advantage of purifying the workpiece while maintaining it in a solid state is in the minimizing of the possibility of the recontamination of the workpiece due to contact with container materials since liquid thorium more readily dissolves impurities than does thorium in the solid state.

As stated above, the partial pressure of oxygen-containing gases in the system during the heating of the thorium-containing specimen must be negligible and for the instant process it must be much lower than the partial pressure of such gases ordinarily found in argon which is considered purified for many other purposes, such as for use in induction casting and arc melting. Therefore, in the prior art practice of induction casting and arc melting casting, no reduction in the oxides of thorium content was noted.

It is known that liquid thorium absorbs impurities from other solid substances upon contact. Thus, the use of oxide containers; such as, magnesia, thoria, and beryllia, in induction and arc melting casting has served to introduce oxides of thorium into the thorium metal rather than effecting any reduction in the thorium oxide content. For this reason, the process of this invention is carried out in the absence of contact with any external thorium oxide-producing material.

The following examples are non-limiting illustrations of the process of this invention.

EXAMPLE I

A workpiece or specimen of thorium containing 1.16 weight percent of thorium dioxide impurity which is equivalent to substantially 1400 p.p.m. by weight of oxygen based on the total weight of the thorium and thorium dioxide and having a surface-to-volume ratio of 2.36 cm.$^{-1}$, was supported on a tungsten support in a cylindrical quartz container or manifold. The tungsten had about 10 p.p.m. oxygen content in the form of oxide impurities. The amount of thorium dioxide in the thorium specimen was determined by a vacuum fusion analysis as described in "Journal of the Institute of Metals," volume 80, page 391 (1952). The quartz container in which the specimen was supported was equipped with gas inlet and outlet means and means for achieving and maintaining a high vacuum. The specimen was heated by induction, the power for which was supplied through a multi-turn water-cooled induction coil around the outside of the quartz manifold positioned in the area where the specimen was located. Power was supplied by a radio frequency power supply and the heating accomplished according to the principles described in "High Frequency Induction Heating," by F. W. Curtice, Second Edition, published by McGraw-Hill Book Co., Inc., New York. The power input to the specimen was controlled so as to maintain the temperature of the specimen at 1610±10° C. The specimen was maintained at this temperature for a period of 100 hours during which time a sublimate collected on a quartz sleeve placed inside the container around the specimen. The quartz sleeve was not heated, therefore, its temperature was substantially 800° C. while the pressure within the container was maintained at less than $10^{-5}$ millimeters of mercury. After heating for 3.3 hours, the power was cut off and the specimen permitted to cool. The specimen was weighed and found to have lost 0.451 gram from its original weight of 143.421 grams. The sublimate collected on the quartz collector sleeve was removed and subjected to X-ray diffraction analysis. This analysis showed the sublimate to consist of a mixture of thorium and thorium dioxide. A vacuum fusion analysis of part of the specimen showed 0.99 weight percent thorium dioxide a decrease of 0.17 weight percent due to the heating. The thorium specimen was again placed in the container and heated at 1610±10° C. for an additional 26 hours after which the procedure described above was repeated. The total decrease in weight of the specimen at the end of the second period was found to be 2.448 grams and the decrease in the thorium oxide content was 1.305 grams. The heating of the specimen was continued for a total of 100 hours with three interruptions for the purpose of determining the weight loss of the specimen and the analysis of the sublimate and specimen. At the end of this time, it was found that the oxygen content of the specimen had decreased to a value in the range of from zero to about 30 p.p.m. of oxygen which is within the range of reliability of the analytical procedure for its determination. Thereafter, heating for an additional period of 110 hours at 1610±10° C. produced no measurable change in the oxygen content of the specimen.

When the procedure of Example I is repeated with a thorium specimen containing 45 mol. percent thorium dioxide based on the total number of mols. of thorium oxide and thorium and a surface-to-volume ratio of substantially 1 cm.$^{-1}$, substantially oxygen-free thorium is obtained after heating for about 3000 hours. The mol. ratio of thorium-to-metal oxide in this instance is greater than unity; namely, 1.22. In other words, there are 58,500 p.p.m. of oxygen in the specimen.

When the procedure of Example I is repeated with a specimen of thorium having a surface-to-volume ratio of substantially 5 cm.$^{-1}$ containing about 50 p.p.m. of oxygen in the form of oxide impurities, the oxygen content is reduced to less than about 30 p.p.m. after heating at 1600±10° C. for a period of substantially 25 hours. Good results are also obtained when the heating is carried out at substantially 1300° C. for a period of substantially 1400 hours.

EXAMPLE II

The procedure of Example I was repeated with the modification that the specimen being purified was heated to a temperature of 1676±10° C. It was found that a reduction of the oxygen content of the thorium specimen to less than about 30 p.p.m. was effected in a period of about 40 hours.

When the process of Example I is repeated at a temperature of 1690° C., good results are obtained.

EXAMPLE III

The procedure of Example I is repeated with the modification that the specimen is in the form of a wire and has a surface-to-volume ratio of 160 cm.$^{-1}$ and is resistance heated to, and maintained at, substantially 1300° C. for a period of about 50 hours. Vacuum fusion analysis at the end of this time indicates that the oxygen content of the thorium is reduced to a value less than about 30 p.p.m. based on the total weight of the specimen.

When the process of Example III is repeated at a temperature of 1000° C., reduction in the oxide content of the specimen is obtained.

EXAMPLE IV

The procedure of Example I is carried on with a cylindrically shaped thorium oxide-containing thorium specimen measuring 0.75 inch in diameter and 6 inches in length, having a surface-to-volume ratio of 2.24 cm.$^{-1}$ and an over-all weight of 480.15 with the modification that a coiled copper tube cooled with running water is positioned within the vacuum container to provide a collecting surface. Upon heating at a temperature of substantially 1610° C. for a period of about 110 hours, it is found upon vacuum fusion analysis that the specimen contains less than about 30 p.p.m. oxygen.

EXAMPLE V

A specimen of thorium containing less than about 30 p.p.m. of oxygen, weighing 139 grams, and having a surface-to-volume ratio of 2.36 cm.$^{-1}$ was oxidized by heating in oxygen until the oxygen content was 23.7 milligrams, providing a thorium-to-thorium dioxide molar ratio of 810. The sample or specimen of thorium dioxide-containing thorium was then subjected to the purification procedure described in Example I. It was found that the vaporization rate had increased by a factor of 20 based on the rate of vaporization of the purified metal, as measured by the loss in weight of specimen after definite periods of heating time. The heating was continued at 1610±10° C. for a period of 96 hours with weight measurements being taken at intervals of 24 hours. The rate of vaporization of the specimen during the last 24-hour period was the same as that of the sample prior to the oxidation. Vacuum fusion analysis shows that the specimen contained less than 30 p.p.m. oxygen by weight.

EXAMPLE VI

The process of Example I was repeated with the modification that a tungsten window measuring 1 cm. square and about 0.001 inch thick was mounted on the inside of the quartz collector so that a part of the sublimate from the specimen was collected on the tungsten. After heating for 8 hours, the sublimate collected on the tungsten was subjected to X-ray diffraction and found to consist of thorium and thorium dioxide. This indicates that the thorium dioxide was not due to reaction between any possible sublimed thorium and silica of the quartz collector sleeve in Example I.

EXAMPLE VII

A specimen of thorium containing 1 weight percent thorium dioxide was melted in a tungsten container which had less than about 30 p.p.m. of oxygen. The melting was carried out in the apparatus described in Example I by means of induction heating. A disc was formed having a surface-to-volume ratio of 2.36 cm.$^{-1}$. Vacuum fusion analysis indicates a substantial reduction in the oxide content.

The procedure of Example VII was repeated using an outgassed tantalum container for the casting of the thorium disc. Chemical analysis indicated that the thorium disc contained 1.5 weight percent tantalum contamination after melting and cooling. No oxide was introduced since the tantalum had an oxygen content of less than about 30 p.p.m. which is within the range of experimental error in the oxygen determination.

When the procedure of Example VII is repeated with the modification that the melted specimen is heated to 2800° C., a decrease in the oxide content is effected.

EXAMPLE VIII

The procedure of Example I is repeated with the modification that instead of maintaining the system under vacuum, it is first evacuated to a pressure of less than about $10^{-5}$ mm. Hg. Purified argon gas having less than 10 p.p.m. by weight of oxygen in the form of oxygen-containing gases is then admitted until a pressure of substantially 760 mm. Hg is obtained. The argon is then swept through the apparatus at a rate such that the argon atmosphere in the apparatus is renewed every 10 minutes. This serves to remove any impurities liberated from the surface of the specimen during the heating. At the end of 130 hours, the specimen is found to have less than about 30 p.p.m. of oxygen.

EXAMPLE IX

The procedure of Example VIII is repeated with an atmosphere of helium gas at a pressure of 5 mm. of Hg with the inert atmosphere being replaced in the apparatus every 30 minutes. At the end of 3000 hours of heating at 1300° C., the specimen is found to contain less than about 30 p.p.m. of oxygen.

Good results are also obtained when the process of Example IX is repeated with a specimen containing 87 parts thorium, 11 parts uranium, and 1 part molybdenum, together with 0.1 weight percent metal oxides based on the total weight of the specimen.

EXAMPLE X

The procedure of Example VIII is repeated with the modification that the thorium-containing specimen is heated in a tungsten container placed within a constant temperature furnace. A reduction in the oxygen content of the specimen is obtained.

Since thorium is a very good reducing agent for the oxides of other metals, thorium-containing alloys which are contaminated by metal oxides can be purified by the process of this invention. In other words, an oxide impurity-containing thorium alloy in which the amount of oxide impurity is from less than about 30 p.p.m. based on the total weight of the alloy to about 47.3 atom percent based on the total number of atoms of thorium and oxygen in the alloy can have its oxide content reduced by heating as hereinabove described from a temperature of about 1000° C. to about 4000° C. This will serve to remove not only the oxides of thorium which may be present in the alloy, but can also serve to cause the oxides of the other metals present in the alloy to react with the thorium and eventually produce thorium oxide species which are volatilized from the surface of the specimen or workpiece under the conditions the process of this invention is carried out.

EXAMPLE XI

Following the procedure of Example I, a thorium-uranium alloy containing 7.6 weight percent uranium and also containing 1.16 weight percent oxide impurities, as well as 1 weight percent fission products, was heated to, and maintained at, a temperature of substantially 1600° C. for a period of substantially 50 hours. A vacuum fusion analysis of the specimen at the end of that time indicated substantially a 95 percent removal of the oxides.

EXAMPLE XII

A thorium specimen containing less than 30 p.p.m. oxygen and having the dimensions of the specimen in Example I was heated in the apparatus described therein in order to determine the vaporization rate. The heating was continued for a period of 165 hours at a temperature of 1610±10° C. The pure thorium vaporized at the rate of 0.037 mg. per hour, per sq. cm. of surface.

The specimen in Example I, containing 1.16 weight percent thorium dioxide, vaporized at the rate of 4.65 mg. per sq. cm. of surface area per hour. Pure $ThO_2$ vaporizes at the rate of 0.00037 mg. of $ThO_2$ per sq. cm. of surface area. The product coming off the surface of the thorium specimen in Example I apparently was thorium monoxide which on cooling disproportionated to form thorium, plus thorium dioxide. This conclusion is based on the known fact that the vapor pressure of thorium dioxide at the temperature involved is too low to account for the selective removal of thorium dioxide from the specimen. The value of $ThO_2$ pressure is shown in "Abstracts of the 133rd Meeting of the American Chemical Society," page 50K, by R. J. Ackerman and R. J. Thorn (1958). In view of the known fact that the $ThO_2$ vapor pressure is much lower than that of pure thorium, it is surprising to find that the thorium oxide content of a thorium-containing specimen can be readily decreased by the process of this invention.

The great increase in rate of vaporization of the oxidized thorium specimen over the rate of vaporization observed when heating a substantially oxide-free specimen of thorium, as illustrated in Example XII, indicates that the vaporized specie was ThO since the vapor pressure of thorium dioxide is lower than that of purified thorium.

Examples VIII and IX indicate that thorium and thorium alloys containing metal oxides can be purified of their oxide content by heating in an inert atmosphere such as argon and helium when the inert atmosphere is renewed at least about every 10 to 30 minutes; that is, the inert atmosphere is swept over the surface of the heated specimen so as to remove the impurities that are being given off.

Since, in the purification, one atom of thorium is removed for the removal of each atom of oxygen the atom ratio of thorium-to-oxygen in the specimen or workpiece must be greater than one in order that a product of pure thorium be obtained when all of the oxide has been removed. In other words when the impurity is present in the form of $ThO_2$, the molar ratio of thorium-to-thorium dioxide must be greater than one in the specimen that is being purified. Stating this in still another manner, the oxide content of a thorium-containing workpiece or specimen can be reduced relative to the thorium content by heating said specimen when the oxygen content is from less than about 30 p.p.m. by weight to about 58,500 p.p.m. The latter represents about 47.3 atom percent based on the total number of atoms of thorium and of oxygen present.

Thorium is one of the best reducing agents for metal oxides as brought out by J. P. Coughlin, "Bureau of Mines Bulletin No. 542" (1954). Therefore, any process utilized in the casting of thorium which employed an oxide container such as beryllia, served only to increase the contamination of the thorium by increasing the thorium dioxide content. Hence, the process of this invention is carried out in the absence of any contact with oxides of thorium-producing materials other than the products being given off from the specimen being purified.

An indication of the difference between purified and impure thorium is seen when a specimen of the type employed in Example I, containing 0.14 weight percent oxygen is placed alongside a similar specimen after purification and containing less than 30 p.p.m. of oxygen, and the two left to stand exposed to the atmosphere for a period of a year. The impure specimen tarnished within a week, and within a month the surface took on a gray color characteristic of oxidized thorium. The purified specimen showed no indications of change of surface color even after standing exposed to the atmosphere for one year.

Thorium purified by the process of this invention so as to contain less than about 30 p.p.m. of oxygen is used in the fabrication of reactor fuel slugs ¾" in diameter and 6" in length containing about 7.6 weight percent uranium. The uranium is enriched to over 90 weight percent in $U^{235}$. The thorium-uranium slugs are then used as fuel in the 7-rod cluster fuel element in the sodium reactor experiment, SRE, reactor by merely replacing the enriched uranium fuel ordinarily used in that reactor with the thorium-uranium alloy. The SRE is described in full as to construction and operation in a text entitled "Sodium Graphite Reactors," by Chauncey Starr and Robert W. Dickinson, 1958 Edition, published by the Addison-Wesley Publishing Co., Inc., Reading, Massachusetts. The thorium-uranium fuel specifications are as given in the following table.

Table

Fuel loading:

| | |
|---|---|
| Initial | Thorium, 7.6 weight percent uranium enriched to over 90 weight percent in U–235. |
| Total fuel | 2904 kg. |

Fuel elements:

| | |
|---|---|
| Number of fuel elements | Forty-three. |
| Number of rods per element | Seven. |
| Fuel element over-all length | 8'6". |
| Element active length | Six feet. |
| Fuel material | Thorium-uranium alloy. |
| Fuel slug length | Six inches. |
| Fuel slug diameter | 0.75 inch. |
| Fuel cladding material | Type 304 stainless steel, 0.010 inch thick. |
| Fuel bonding material | NaK alloy, 0.010 inch thick. |

Criticality and power production is obtained with the thorium-uranium fueled reactor in the same manner as with the SRE reactor.

While the process of this invention has been described above in detail, it is to be understood that this description is by way of example only and not by way of limitation. The spirit and scope of this invention is limited only by the appended claims.

We claim:

1. A method of decreasing the amount of oxide impurity in a workpiece consisting essentially of thorium comprising heating said workpiece in a system containing a region maintained at a lower temperature than the temperature of said workpiece, said heating being conducted in the absence of contact of said workpiece with impurities producing thorium oxide in said workpiece in an atmosphere substantially free of oxygen, said heating being carried out at a temperature of from about 1300° C. to about 1700° C. for a period of time sufficient to reduce the oxides of thorium content of said workpiece, whereby any products given off said workpiece which are condensable at a temperature lower than the temperature of said heated workpiece are condensed in said lower temperature region.

2. A method of decreasing the amount of oxide impurity in a workpiece consisting essentially of the thorium comprising heating said workpiece in a system containing a region maintained at a lower temperature than the temperature of said workpiece, said heating being conducted in a vacuum whereby any product given off from the surface of said workpiece which is condensable at a temperature lower than the temperature of said workpiece will condense in said lower temperature region, said heating being carried out in the absence of contact of said workpiece with impurities producing thorium oxide in said workpiece at a temperature of from about 1300° C. to about 1700° C. for a period of time sufficient to reduce the oxides of thorium content of said workpiece.

3. A method of decreasing the amount of oxide impurity in a workpiece consisting essentially of thorium comprising heating said workpiece in the absence of contact with impurities producing thorium oxide in said workpiece, said heating being conducted in a system provided with an element having a surface maintained at a temperature lower than the temperature of said heated workpiece, whereby any product given off the surface of said workpiece which is condensable at a temperature lower than the temperature of said workpiece will condense on said element, said heating being carried out in a vacuum at a temperature of from about 1300° C. to about 1700° C. for a period of time sufficient to reduce the oxides of thorium content of said workpiece.

4. The method of claim 3 wherein the surface of said element is maintained at a temperature of from about 100° C. to about 1000° C. lower than the temperature of said heated workpiece.

5. The method of claim 3 wherein the surface of said element is maintained at a temperature of from about 100° C. to about 1000° C. lower than the temperature of said heated workpiece and wherein said heating is carried out at a temperature of from about 1300° C. to about 1700° C.

6. The method of claim 3 wherein the surface of said element is maintained at a temperature of from about 100° C. to about 1000° C. lower than the temperature of said heated workpiece and wherein said heating is carried out at a temperature of from about 1400° C. to about 1650° C.

References Cited in the file of this patent

UNITED STATES PATENTS

| | | |
|---|---|---|
| 997,883 | Weintraub | July 11, 1911 |
| 1,719,975 | Gero | July 9, 1929 |
| 1,814,719 | Marden et al. | July 14, 1931 |
| 2,756,138 | Meister | July 24, 1956 |